United States Patent [19]

Haralambopoulos et al.

[11] Patent Number: 5,598,233
[45] Date of Patent: Jan. 28, 1997

[54] SOFT CONTACT LENS WITH CONTAMINATION INDICATOR

[75] Inventors: Constantine Haralambopoulos, Rochester; Alexandra Hara, New York, both of N.Y.

[73] Assignee: Harold A. Gell, Silver Spring, Md.

[21] Appl. No.: 292,016

[22] Filed: Aug. 18, 1994

[51] Int. Cl.$^6$ ........................................ G02C 7/04
[52] U.S. Cl. ................... 351/160 H; 351/160 R; 351/162
[58] Field of Search ............... 351/160 R, 160 H, 351/177, 161, 162

[56] References Cited

U.S. PATENT DOCUMENTS

| | | | |
|---|---|---|---|
| 2,393,266 | 1/1946 | Riddle | 88/54.5 |
| 2,989,894 | 6/1961 | Gordon | 351/160 |
| 3,227,855 | 1/1966 | Meyer, Sr. et al. | 219/384 |
| 3,228,741 | 1/1966 | Becker | 351/160 |
| 3,246,941 | 4/1966 | Moss | 351/160 |
| 3,431,046 | 3/1969 | Conrad et al. | 351/160 |
| 3,647,736 | 3/1972 | Ewell | 260/29.6 |
| 3,657,085 | 4/1972 | Hoffmeister et al. | 204/157.1 R |
| 3,691,263 | 9/1972 | Stoy et al. | 264/1 |
| 3,833,786 | 9/1974 | Brucker | 219/121 L |
| 4,055,378 | 10/1977 | Feneberg et al. | 351/160 |
| 4,143,017 | 3/1979 | Tarumi et al. | 260/29.7 |
| 4,211,476 | 7/1980 | Brummel et al. | 351/160 R |
| 4,353,849 | 10/1982 | Lewison | 264/2.7 |
| 4,401,371 | 8/1983 | Neefe | 351/160 R |
| 4,401,372 | 8/1983 | Mancini et al. | 351/160 H |
| 4,534,915 | 8/1985 | Neefe | 264/1.4 |
| 4,534,916 | 8/1985 | Wichterle | 264/2.1 |
| 4,616,910 | 10/1986 | Klein | 351/162 |
| 4,618,227 | 10/1986 | Bayshore | 351/161 |
| 4,621,912 | 11/1986 | Meyer | 351/160 R |
| 4,659,522 | 4/1987 | Neefe | 264/2.1 |
| 4,666,267 | 5/1987 | Wichterle | 351/160 H |
| 4,680,336 | 7/1987 | Larson et al. | 524/548 |
| 4,761,069 | 8/1988 | Truong et al. | 351/160 H |
| 4,820,038 | 4/1989 | Seger et al. | 351/160 H |
| 4,886,350 | 12/1989 | Wichterle | 351/160 H |
| 4,890,911 | 1/1990 | Sulc et al. | 351/160 H |
| 4,948,245 | 8/1990 | Seger et al. | 351/160 H |
| 4,994,080 | 2/1991 | Shepard | 623/5 |
| 5,044,742 | 9/1991 | Cohen | 351/161 |
| 5,104,213 | 4/1992 | Wolfson | 351/160 R |
| 5,159,360 | 10/1992 | Stoy et al. | 351/177 |
| 5,347,326 | 9/1994 | Volk | 351/160 R |

FOREIGN PATENT DOCUMENTS 592055  9/1947  United Kingdom ............ 351/160

OTHER PUBLICATIONS

Article entitled "Bausch & Lomb Eyes Japanese Markets", Tuesday, Oct. 22, 1991.
Article entitled "Japan Gets Eyeful of B&L".

*Primary Examiner*—Scott J. Sugarman
*Assistant Examiner*—Jordan Schwartz
*Attorney, Agent, or Firm*—Harold Gell

[57] ABSTRACT

A soft contact lens contamination warning means, comprising openings through the lens material which are dimensioned to be invisible to the wearer but allow wastes to flow from the posterior to the exterior surface of the lens without critically distorting the lens optical section or interrupting the visual continuity of the lens flange section. The dimensions of the openings are designed so that when waste materials accrete on their inner surfaces or walls, they expand due to the accumulated accreted waste to a point where they interrupt the visual continuity of the lens and becomes visible to the wearer, alerting the wearer of the need to change or discard lenses.

20 Claims, 3 Drawing Sheets

SOFT CONTACT LENS WITH CONTAMINATION INDICATOR

FIELD OF THE INVENTION

This invention relates to soft contact lenses including a multipurpose means for allowing the lens to be self cleaning and to visually indicate to the wearer when the lens requires changing or cleaning or discarding.

BACKGROUND OF THE INVENTION

Soft, extended wear contact lenses are currently in use which incorporate gas permeable plastics as structural materials and holes and edge treatment to supply the cornea with the oxygen required to prevent changes to the endothelial cells and edema or cornea swelling. These various devices enhance the flow of lachrymal fluids under the lens to supply the cornea with the required oxygen. As the permeability of the lens material is reduced and the bleed apertures closed due to contamination by sloughed-off epithelial cells and metabolic wastes, evaporation of the fluids on the cornea surface is reduced and the cornea is warmed by the blood supply. This is irritating and dangerous because the temperature of the cornea must remain at a level relatively lower than body temperature or its metabolic process will accelerate and contamination of the lens will speed up until it rapidly reaches a point where it constitutes a significant health threat.

Numerous attempts have been made to solve the above problems but the end results of these approaches is that the wear duration of the lens is slightly extended but ultimate contamination unbeknown to the wearer still occurs and a health threat is presented. For instance, B. Meyer in U.S. Pat. No. 4,621,912 on "Foraminated Optical Contact Lens" provides a plurality of micropore passageways through the lens surfaces. When this lens is first installed, it performs the needed function of allowing waste materials to be bled off from the underside of the lens but due to the extremely small size of the holes, they quickly clog and the aforesaid contamination and heat buildup problems begin their rapid chain reaction.

D. Riddle, U.S. Pat. No. 2,393,266 on "Contact Lens" is a relatively early example to solve contaminant buildup on the underside of the contact lens. In this approach, radial channels are provided on the cornea side of the lens and terminate in holes passing completely through the lens which allows the channeled waste material to exit the under surface. This system, as in Meyer above, quickly clogs and the contamination spiral rapidly accelerates.

Another early approach which is the concept of providing a plurality of cuts in the peripheral portion of the lens which are in the form of short arcs such as taught by Becker in U.S. Pat. No. 3,228,741 on "Corneal Contact Lens Fabricated From Transparent Silicone Rubber". Becker suggests arc shaped channels having a radius which originates at the center of the lens but this approach has proved unsuccessful because material buildup under the lens quickly reaches a point where irritation of the eye begins.

Lenses have been made with small holes drilled through the lens (fenestration), in an effort to overcome this problem. Lens material is removed to produce the hole. If the holes are large, they will be seen by the wearer and by others, and if they are small enough not to be seen, they become clogged with body secretions and they become useless. An example of this technology may be found in C. Neefe, U.S. Pat. No. 4,401,371, at Column 1, Lines 28–32.

Clogging of small "fenestration" holes in the prior art lenses such as Neefe discussed above or C. Wichterle, U.S. Pat. No. 4,666,267 is due to the fact that the hole walls are rigid and they do not flex with eye blinking to thereby flex the hole walls and dislodge the deposits as they accumulate during normal usage of the lens.

In addition to the above-mentioned problems, there is the problem of compliance of a contact lens wearer with the recommendations of lens manufacturers and ophthalmologists, regarding regular changing/discarding and/or properly cleaning a lens. Unless these recommendations are faithfully followed, particularly with disposable and extended wear contact lenses, the lenses are rendered hygienically unsuitable for further wear and are dangerous to the health of the wearer. Moreover, the recommendations for proper maintenance/change of the lenses represent an average that does not take into account the variations of eye physiology among individuals environmental conditions (such as dustiness). For one person discarding/cleaning his/her lenses every two weeks may be adequate, whereas for another person, or for the same person in a different environment, this time interval may be shortened to a few days.

A need therefore exists for an indicator for soft contact lenses which provides a signal of progressive intensity to a contact lens wearer of contaminate buildup. This must not interfere with normal vision, and must be detectable only by the lens wearer, signifying to the lens wearer that it is time to change, dispose and/or properly clean the lenses.

Additionally, the indicator, should not alter the soft lens composition or necessitate the introduction of new substances into the lens, and it must be applicable to all soft contact lenses.

OBJECTIVES OF THE INVENTION

Shortcomings of prior extended wear contact lenses are overcome by the present invention by providing slit channels in the form of rays around the periphery of a lens. The slit channels are straight line cuts along the rays emanating from the center of the lens which do not affect the optical properties of the lens. However, as lachrymal fluid flows through the openings, due to pressure differential, the openings part slightly to allow the waste materials to exit as in the prior art devices. However, in the instant invention, as the opening becomes contaminated, the space created by the slit, due to the accretions deposited on the walls of the slit, widens to a point where the wearer can visually detect the ray like features of the slits. This is distinguishable from the prior art devices such as Becker in that as the slits open, they do not materially affect the optical zone curvature and relation of the optical zone to the cornea as in prior art devices which causes the optical zone to be raised away from the cornea simply changing the optical properties of the lens. In the present invention, as the radial slits open, the relatively flat skirt of the lens surrounding the optical zone becomes wavy to accommodate the increased diameter so that the optical zone remains constant.

A primary objective of the present invention is to provide a means in the portion of an extended wear or a disposable contact lens surrounding the optical zone which will allow lachrymal fluid and waste material in it to be vented from under the lens and which in addition will provide an optical indication to the wearer when the lens becomes contaminated to the point where it should be changed.

Another objective of the present invention is to provide slits in the skirt portion of an extended wear contact lens which emanate in a ray like fashion and which will gradually open up as contaminants build up under the lens and are forced out through the slits.

SUMMARY OF THE INVENTION

A soft contact lens, comprising an optical correcting center section, a supporting flange surrounding said optical correcting center section, radial cuts through the material of the lens forming said flange positioned and dimensioned to be invisible to the wearer, said cuts having a length to lens thickness ratio of at least 1 which will permit deflection of the lens flange about said slits to permit wastes to flow from the posterior to the exterior surface of the lens without critically distorting the optical section or interrupting the visual continuity of the flange section so long as material does not accrete on the inner surfaces of said cut, and further dimensioned so that when waste materials accrete on the inner surfaces of said cut, said cut expands due to the accumulative accrete waste to a point where it interrupts the visual continuity of said flange and becomes visible to the wearer, alerting the wearer of the need to change or discard lenses.

DETAILED DESCRIPTION OF THE INVENTION

Figure 1:
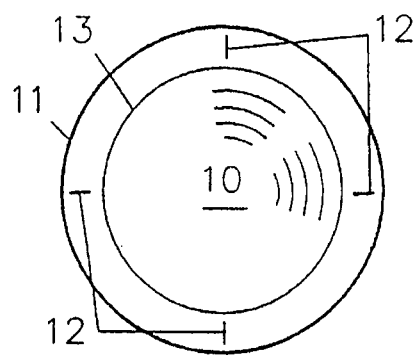
FIG. 1 illustrates a preferred embodiment of the present invention which includes a plurality of slits cut near the peripheral edge of the lens and outside the optical zone boundary.

All of the problems of the prior art are eliminated by the present invention wherein minute slits are cut in a soft contact lens to form fluid passages through which the lachrymal fluid crosses the lens walls. In normal wear of the lens, deposits from the lachrymal fluid and metabolic debris progressively accumulate in the fluid passages, changing their mechanical and optical characteristics. These changes are utilized by the present invention to provide visual and/or tactile sensations to the lens wearer, thus serving as an indicator that the lens has to be changed (replaced or properly cleaned), as it has been rendered hygienically unsuitable for further wear. A soft contact lens with fluid passages exhibits superior comfortably to its wearer, as it permits the transport and exchange across the lens walls of all components of the lachrymal fluid.

Preferred materials for making soft contact lenses include high water content hydroxyls of polyhydroxymethylmethacrylate (HEMA) compositions, copolymers of HEMA and N-vinylpyrrolidone (NVP), for example, as well as various silicone rubber compositions. The only mechanism for transport and exchange of gases and lachrymal fluid components across the lens walls is the diffusion mechanism. Consequently components which are insoluble in the material of the lens and cannot penetrate through it are excluded from this transport. Commonly, such materials are the components of higher molecular weight for hydragel lenses and all metabolic components, except oxygen and carbon dioxide for silicon lenses, see for instance O. Wichterle, U.S. Pat. No. 4,666,267, at Column 1, Lines 23–29.

Fluid passages are referred to as "slit channels" throughout this patent specification. They are minute slits or cuts made in a soft contact lens, extending through both walls of the lens and forming a passage between the anterior (convex) and posterior (concave) surfaces of the lens. The walls of a slit channel are smooth and normally in touching contact with each other due to the elasticity of the lens material and because no lens material is removed in the slit channel area. For the same reasons, a slit channel does not locally alter the geometry of the curvatures of the two surfaces of the lens.

Thus, in a "fresh" (new, unused) soft contact lens having a slit channel, the optical coupling between the walls of the channel is practically complete and the slit channel is indiscernible, either by sensory feel in the eye of a lens wearer or visually. Furthermore, the optical coupling in the slit channel is dynamically maintained by the film of lachrymal fluid present in the channel, in spite of eye blinking and the concomitant minute flexing of the elastic walls of the slit channel.

During normal wear, such a soft contact lens is bathed in lachrymal fluid, while being subjected to the normal blinking action of the eye. In that environment, a slit channel presents a "path of least resistance" to transport and exchange lachrymal fluid from the anterior to posterior surfaces of the lens, as well as to the various metabolic wastes and debris, normally produced in the eye, in the opposite direction. This transport mechanism of lachrymal fluid is further enhanced by normal blinking, whereby the walls of a slit channels are flexed and "squeezed" minutely, continuously renewing the lachrymal fluid in the slit channel. This action, as importantly, prevents a slit channel from premature clogging with metabolic debris and other substances normally present in the lachrymal fluid as, it is believed, the repeated minute flexing of the walls of a slit channel help "dislodge" deposits from rapidly accumulating within the channel In the course of continuing wear of such a lens, however, metabolic debris and other substances eventually deposit and gradually accumulate predominately on the walls and edges of a slit channel This gradual process gives rise to two effects, not necessarily in that order:

First: The walls of the slit channel become separated by accumulated deposits. The index of refraction of accumulating deposits is different from that of the lachrymal fluid, thus the slit channel becomes optically decoupled with respect to the rest of the lens, in spite of the presence of lachrymal fluid in the channel which normally acts as an optical coupling medium for the slit channel; and Second: The accumulating deposits in the slit channel gradually push apart the channels's walls, mechanically distorting ever so slightly the normal geometry of the slit channel. This distortion produces minute mechanical anomalies or "bumps" on the lens surface along the boundaries of the slit channels.

These two effects, separately or in combination, produce the indicators of this invention which alert a soft lens wearer of the need to change/discard/properly clean his/her contact lenses before the lenses become hygienically unsuitable for further wear. More specifically, the optical decoupling produced according to the first effect results in light scattering at the slit channel.

The "bumps" produced according to second effect are felt in the eye of a contact lens wearer as a sensation of surface irregularities on the lens, similar to the sensation produced by the presence of a small foreign body, such as a speck of dust in the eye. This tactile sensation is slight and not irritating to tissues of the eye. It does not cause discomfort and its onset and progression are gradual in intensity.

This is visible to the lens wearer as spots of light and light patterns that are superimposed in the visual field without interfering with normal vision. This visual effect is more pronounced with spectral light.

The visual effect perceived by a contact lens wearer due to the optical decoupling of a slit channel in lens is much more pronounced when the slit channel extends into the optical zone of the lens. However, even when a slit channel is outside of the optical zone, some scattered light produced by an optically decoupled slit channel is perceivable by the wearer, as the lens acts as a light waveguide for the scattered light.

FIG. 1 illustrates a preferred embodiment of the present invention which includes a plurality of slits 12 cut near the peripheral edge 11 of the lens 10 and outside the optical zone boundary 13. The slits are arranged as equally spaced rays emanating from the center of the lens and are straight cuts through the lens from the anterior to the posterior surface. The cuts have a length to lens material thickness ratio of at least 1. This permits distortion of the lens flange about the cuts to permit liquid and wastes to flow from the posterior to the exterior surface of the lens without critically distorting the optical section or interrupting the visual continuity of the flange section so long as material does not accrete on the inner surfaces, walls, of the cut. (The term critically distorting refers to an alteration of the optical or corrective properties of the lens to a point where it affects its intended purpose.) However, when waste materials accrete on the inner surfaces of the cut, the cut expands due to the accumulative accreted waste to a point where the distortion of the lens flange about the cut interrupts the visual continuity of the flange and the cut becomes visible to the wearer. Thus alerting the wearer of the need to change or discard lenses. Four slits are illustrated but any number may be used at the option of the designer. During normal use, pressure from the fluids under the lens force biological matter accumulating under the lens out through the slits 12 and thus lengthen the period during which a lens may be continuously worn in comfort. A Second benefit of the slits 12 is that as biological material is forced out of slits, a small amount of the material adheres to the inside of the slit and when the walls becomes coated to the point where a significant buildup of contaminants on the posterior surface of the lens is eminent, the normally invisible slits become visible due to optical decoupling, thus providing the wearer with an indication that the lens must be changed or discarded.

Figure 2:
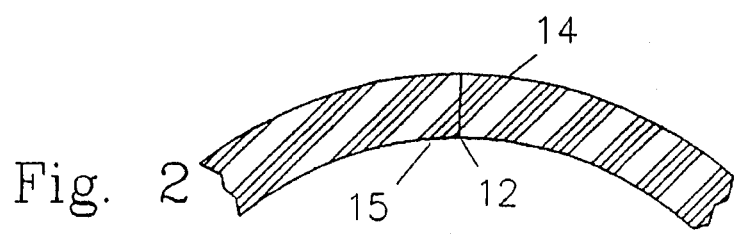
FIG. 2 is a cutaway view illustrating one of the radial cuts in the lens.

FIG. 2 is a cutaway view illustrating one of the radial cuts in the lens. Note that the cut 12 passes from the anterior surface 14 to the posterior surface 15 along a line that is perpendicular to both the anterior convex surface and the posterior concave surface. This creates a passage through which fluid may flow from the posterior surface 15 to the anterior surface 14.

Figure 3A:
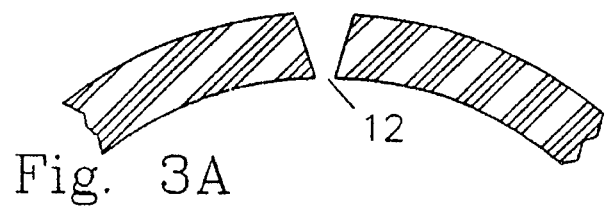
FIGS. 3A, 3B and 3C indicate alternate embodiments of the subject invention where the radial cuts or slits are fabricated as channels of removed material to enhance their properties.

FIGS. 3A, B and C indicate alternate embodiments of the subject invention where the radial cuts or slits are fabricated as the channels of removed material to enhance their properties which are directed primarily to extending the use of the lens. With a channel as opposed to a cut, biological matter passes through at a faster rate and a longer period of time is required for the buildup on the walls of the channels to occur. Once the buildup reaches the point where the channel openings can no longer bleed off biological matter, they become visible to again indicate to the wearer that it is time to change or discard the lens.

Figure 3B:
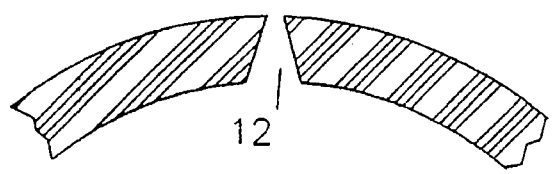
Figure 3C:
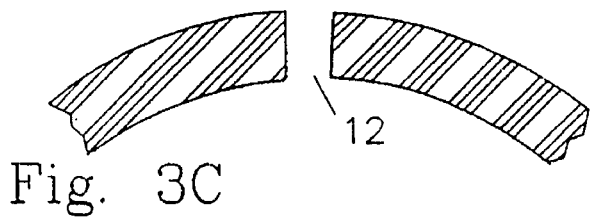

In FIG. 3A the channel is wider at the anterior surface than the posterior surface. The embodiment of FIG. 3B has a channel configuration wherein the anterior surface is narrower than the posterior surface. In FIG. 3C the channel is of uniform width.

Throughout this patent the term channel refers to either cuts or slit channels as illustrated in FIGS. 2 and 3A through C.

Figure 4:
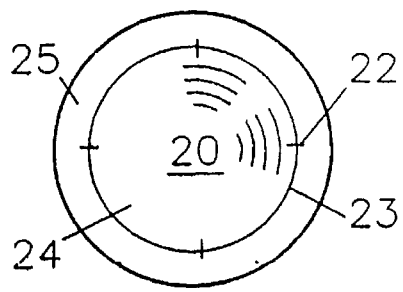
FIG. 4 illustrates an alternate placement of the cuts or slit channels of the present invention.

FIG. 4 illustrates an alternate placement of the channels of the present invention. In this embodiment, the lens 20 is provided with channels 22 which are positioned around the peripheral edges of the lens along rays emanating from the lens center. The length and location of the channels in this embodiment are such that they extend from inside the outer peripheral edge of the lens per se 24 through the boundary of the viewing area 23 and into the skirt 25 so that when a channel 22 becomes contaminated, it becomes obvious to the wearer because of the slight imperfection that is seen while the wearer looks through the lens. The channels are illustrated as being bisected into equal length segments by the edge 23 of the viewing area but the relative size of the segments is a designers choice.

Figure 5:
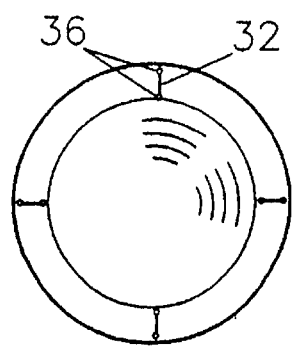
FIG. 5 is an embodiment where a bore is provided at opposite ends of the cuts or slit channels.

A further embodiment which enhances the long wear properties of the lens is illustrated in FIG. 5 where a bore 36 is provided at opposite ends of the slit channels 32. In this embodiment, the bores act as rip stop holes as well as enhancing the movement of fluid and bacterial material from the posterior to the anterior surfaces of the lens. They also prevent accidental tears in the lens when a user is placing them in service.

Figure 6:
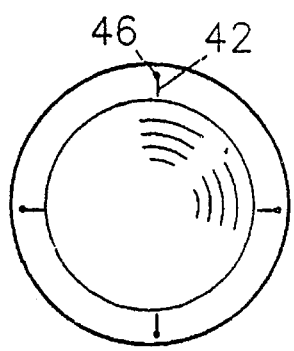
FIG. 6 is an embodiment illustrating the use of a rip stop preventive means for cuts or slit channels.

FIG. 6 is a further embodiment illustrating the use of rip stop preventive means. In this embodiment, only one rip stop hole 46 is provided for each slit 42. The rip stop holes are on the outer end of each channel where accidental tearing is most prone to occur.

Figure 7:
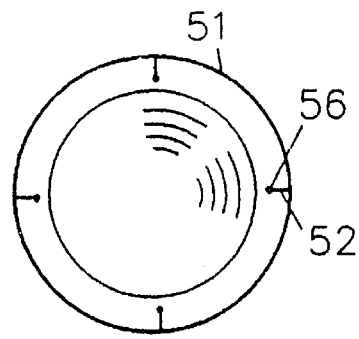
FIG. 7 is an embodiment in which the cuts or slit channels are continued through the periphery of the outer rim of the lens.
Figure 9:
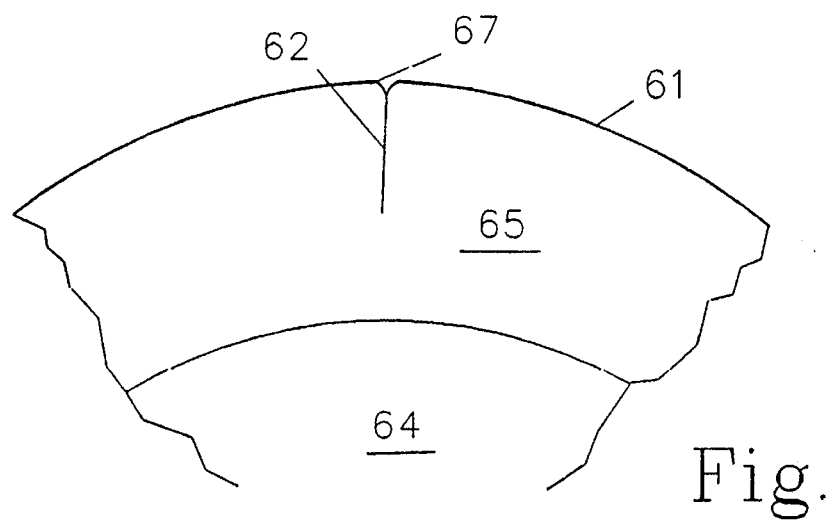
FIG. 9 illustrates a cut or slit channel beveled along the lens perimeter.

In FIG. 7, the venting channels 52 are continued through the periphery of the outer rim 51 of the lens. A rip stop hole 56 is provided to prevent these slits from tearing into the main body of the lens. If desired, the channel 62 may be snip cut and the edges along the lens perimeter 61 beveled or tapered 67 as illustrated in FIG. 9 where 64 is the viewing portion of the lens and 65 is the lens skirt.

Figure 8:
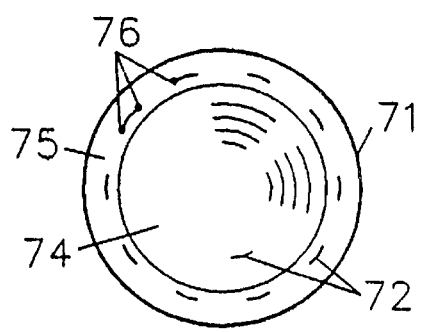
FIG. 8 is an embodiment wherein the cuts or slit channels are arcuate in shape and concentric with the lens edge.

FIG. 8 illustrates an embodiment that has cuts as arcuate channels 72 which are concentric with the lens edge 71. The arcuate channels 72 may have rip stops 76. The channels 72 may be located in any region of the lens, including the flange 75 or the optical zone 74. Arcuate channels may be easier to produce in some methods of mass manufacturing of the lenses. The channels may be cuts or slit channels as illustrated in FIGS. 2 and 3. If FIG. 3 style channels are used, they can be shaped as arcuate tapered slots of crescent shape. The advantage of a tapered slot is that in the vicinity of its tips, the channel behaves as a slit, whereas the wider part of the channel provides the more efficient lachrymal fluid transport of a slit channel from which material has been removed.

Figure 10:
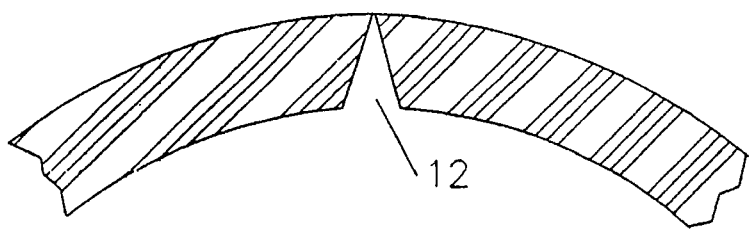
FIG. 10 illustrates channels on the inner lens surface combined with through the lens cuts.
Figure 11:
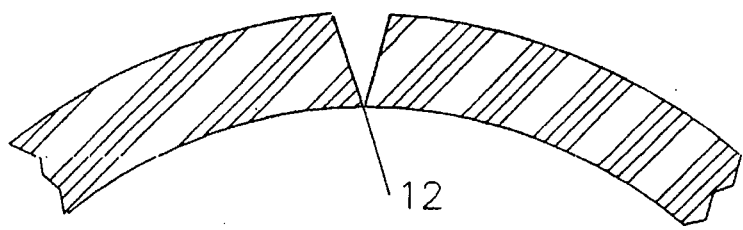
FIG. 11 illustrates channels on the outer lens surface combined with through the lens cuts.
Figure 12:
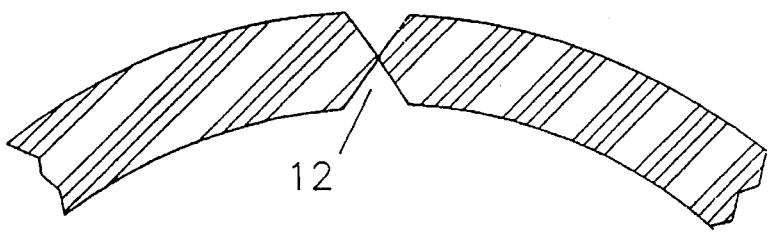
FIG. 12 illustrates channels on both lens surfaces joined by through the lens cuts.

The channels illustrated in FIGS. 2 and 3A through C are flush with both lens surfaces. This type of channel is an unrecessed channel. A modified type of channel can be made along a minute depression formed in one or both surfaces of the lens as illustrated by the cross sectional view of FIGS. 10, 11 and 12. The arcuate channels of FIG. 8 may also be made in the trough of a minute groove formed on one or both surfaces of the lens similar to the cross sections illustrated by FIGS. 10, 11 and 12. This modified channel is a recessed slit channel. The recess provides an effective way of preventing the formation of minute irregularities in the lens surface caused by the fabrication of the channels.

The channels may be produced by cutting or in a fully hydrated soft lens by puncturing the lens with or without removing lens material with the puncture. Puncture formed channels have an irregular pattern of disrupted lens material whose walls are normally in touching contact as are the slit or cut channels.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What is claim is:

1. A lens, comprising:

an optical correcting center section;

flange surrounding said optical correcting center section; and at least one flexible opening through the material of said lens dimensioned to permit liquid carried wastes to flow from the posterior to the exterior surface of said lens wherein said opening is dimensioned so that when waste materials accrete on the inner surfaces of said opening, said opening expands due to the accumulative accreted waste to a point where it interrupts the visual continuity of said lens and becomes visible to the wearer.

2. A lens as defined by claim 1, wherein said opening is wider on the posterior side of said lens than the exterior side of said lens.

3. A lens as defined by claim 1, wherein said opening is wider on the exterior side of said lens than the posterior side of said lens.

4. A lens as defined by claim 1, wherein said opening is equal in width on the exterior and posterior sides of said lens.

5. A lens as defined by claim 1, wherein said opening is formed by removal of lens material of equal width on the exterior and posterior sides of said lens, said removed material causing tapered openings that join in a section between said exterior and posterior sides of said lens at which no material is removed but said opening continues as a cut through the remaining lens material.

6. A lens as defined by claim 1, wherein said opening is formed by removal of lens material from the exterior side of said lens, said removed material causing a tapered opening that ends on the posterior side of said lens where no material is removed but said opening continues as a cut through the remaining lens material.

7. A lens as defined by claim 1, wherein said opening is formed by removal of lens material from the posterior side of said lens, said removed material causing a tapered opening that end on the exterior side of said lens where no material is removed but said opening continues as a cut through the remaining lens material.

8. A lens as defined by claim 1, wherein said opening is an elongated channel positioned along a ray emanating from said lens center, said channel having a length to lens thickness ratio which will permit deflection of said lens about said channel to permit liquid and wastes to flow from the posterior to the exterior surface of said lens without critically distorting said optical correcting center section or interrupting the visual continuity of said flange and dimensioned so that when waste materials accrete on the inner surfaces of said channel, said channel expands due to the accumulated accreted waste to a point where it becomes visible to the wearer.

9. A lens as defined by claim 8, wherein said elongated channel bisect the boundary between said flange and said optical correcting center section.

10. A lens as defined by claim 8, wherein said elongated channel is positioned wholly within said flange surrounding said optical correcting center section.

11. A lens as defined by claim 8, wherein said elongated channel is terminated at one end by a rip-stop bore.

12. A lens as defined by claim 8, wherein said elongated channel is terminated at both ends by rip-stop bores.

13. A lens as defined by claim 8, wherein said elongated channel is positioned wholly within said flange surrounding said optical correcting center section and extends through the peripheral edge of said lens.

14. A lens as defined by claim 8, wherein said elongated channel is beveled at said peripheral edge of said lens.

15. A lens as defined by claim 1, wherein said opening is an arcuate channel which is concentric with the edge of said lens and has a length to lens thickness ratio which will permit deflection of said lens about said channel to permit liquid and wastes to flow from the posterior to the exterior surface of said lens without critically distorting said optical correcting center section or interrupting the visual continuity of said flange and dimensioned so that when waste materials accrete on the inner surfaces of said channel, said channel expands due to the accumulated accreted waste to a point where it becomes visible to the wearer.

16. A lens as defined by claim 15, wherein said opening is an arcuate channel which is concentric with the edge of said lens and positioned wholly within said flange surrounding said optical correcting center section.

17. A lens as defined by claim 15, wherein said elongated channel is terminated at one end by a rip-stop bore.

18. A lens as defined by claim 15, wherein said elongated channel is terminated at both ends by rip-stop bores.

19. A lens, comprising:

an optical correcting center section;

a flange surrounding said optical correcting center section;

at least one radial cut through the material of said lens;

said cut positioned and dimensioned to be invisible to the wearer; and said cut having a length to lens thickness ratio which will permit deflection of said lens about said cut to permit liquid and wastes to flow from the posterior to the exterior surface of said lens without distorting said optical correcting center section or interrupting the visual continuity of said flange and dimensioned so that when waste materials accrete on the inner surfaces of said cut, said cut expands due to the accumulated accreted waste to a point where it becomes visible to the wearer.

20. A contamination indicator for a contact lens, comprising:

passage means not normally discernible by the wearer of said contact lens for allowing fluid and contaminates to pass from the eye side of said lens to the exterior side of said lens;

said passage means including wall means for accumulating a portion of said contaminates passing through said passage means; and said passage means dimensioned to allow said wall means to separate as a direct function of the amount of said contaminates accumulated on said wall means whereby said passage is rendered discernible by the wearer.

* * * * *